(12) United States Patent
Svrcek

(10) Patent No.: US 11,638,412 B2
(45) Date of Patent: May 2, 2023

(54) ANIMAL FEEDER

(71) Applicant: Gerald Svrcek, Cocoa, FL (US)

(72) Inventor: Gerald Svrcek, Cocoa, FL (US)

(73) Assignee: Gerald Svrcek, Cocoa, FL (US)

( * ) Notice: Subject to any disclaimer, the term of this patent is extended or adjusted under 35 U.S.C. 154(b) by 180 days.

(21) Appl. No.: 17/094,240

(22) Filed: Nov. 10, 2020

(65) Prior Publication Data

US 2021/0368737 A1 Dec. 2, 2021

Related U.S. Application Data

(60) Provisional application No. 63/029,763, filed on May 26, 2020.

(51) Int. Cl.
*A01K 5/02* (2006.01)

(52) U.S. Cl.
CPC .................................. *A01K 5/0291* (2013.01)

(58) Field of Classification Search
CPC ...... A01K 5/02; A01K 5/0225; A01K 5/0241; A01K 5/0258; A01K 1/10; G01F 11/10; G01F 11/28
See application file for complete search history.

(56) References Cited

U.S. PATENT DOCUMENTS

| | | | |
|---|---|---|---|
| 2,793,791 A | 5/1957 | Clark | |
| 2,869,638 A | 1/1959 | Sullivan | |
| 3,604,601 A | 9/1971 | Boling | |
| 3,648,660 A | 3/1972 | Esquival | |
| 3,659,754 A | 5/1972 | Barone et al. | |
| 4,279,221 A | 7/1981 | Arvizu | |
| 4,964,535 A | 10/1990 | Curwen | |
| 5,230,300 A * | 7/1993 | Mezhinsky | A01K 5/02 119/51.11 |
| 6,487,987 B1 | 12/2002 | Choi | |
| 6,622,655 B2 * | 9/2003 | Springett | A01K 1/10 119/61 |
| 7,523,717 B2 | 4/2009 | Nicholes | |
| 8,096,265 B1 | 1/2012 | Wisecarver | |
| 8,443,758 B1 * | 5/2013 | Williams | A01K 39/01 119/57.2 |
| 8,683,948 B2 | 4/2014 | Gerke | |
| 8,800,489 B2 | 8/2014 | Coxsey | |

(Continued)

*Primary Examiner* — Joshua J Michener
*Assistant Examiner* — Henry Hooper Mudd
(74) *Attorney, Agent, or Firm* — John L. DeAngelis; Wolter, Van Dyke, Davis, PLLC

(57) ABSTRACT

A dispenser for dispensing animal feed. An inlet tube in an upper region receives feed from a container and a dispensing tube intersecting the inlet tube defines an opening along a lower surface through which the feed can pass. A feed drive assembly, comprising radial vanes, rotates within the dispensing tube. Regions between vanes receive and hold feed from the inlet tube. Two switches activate a motor when either is closed, and the motor turns the feed drive assembly. A pivotable arm extends downwardly from the dispenser such that a force applied thereto (by an animal wandering below the dispenser) closes one of the switches to supply power to the motor or to a controller controlling operation of the motor. Rotation of the motor and thereby rotation of the feed drive assembly moves a region holding feed into alignment with the opening causing feed to be dispensed through the opening.

17 Claims, 3 Drawing Sheets

(56) References Cited

U.S. PATENT DOCUMENTS

| | | |
|---|---|---|
| 9,655,342 B2 | 5/2017 | Christie |
| 9,901,072 B2 | 2/2018 | Moyer |
| 2004/0083980 A1* | 5/2004 | Harding .................. A01K 1/10 119/60 |
| 2014/0224179 A1* | 8/2014 | Mignone ................ A01K 61/02 |
| 2016/0227736 A1* | 8/2016 | Monk ...................... A01K 5/02 |
| 2019/0037803 A1* | 2/2019 | Christie .................. A01K 5/02 |

* cited by examiner

US 11,638,412 B2

ANIMAL FEEDER

CROSS REFERENCE TO RELATED APPLICATIONS

Under the provisions 35 U.S.C. 119(e), the present application claims priority to the provisional application filed on May 26, 2020 and assigned application No. 63/029,763

FIELD OF INVENTION

The invention relates to an electronic animal-activated animal feeder with novel activation and delay features.

BACKGROUND OF THE INVENTION

There are two types of animal feeders in common use for both wild game and domestic animals. One type is a spinner plate motorized feeder and the other a gravity feeder. Both types have significant limitations.

The spinner plate feeder comprises a plate horizontally mounted below a feed-storage hopper. Gravity causes the feed, such as corn kernels, stored in the hopper to fall through an opening in the bottom surface of the hopper and onto the spinner plate. A motor rotates the spinner plate and centrifugally casts the feed or corn onto the ground around the hopper.

This feeder design is limited to feed that is corn-kernel size, as larger pieces of feed will not fit onto the spinner plate and smaller types will simply pour from the opening, spill from the spinner plate, and fall to the ground.

Another shortcoming with the spinner plate is exposure of the feed to weather elements. Rainy or humid weather causes the feed to clump together in the hopper, jamming the mechanism. Moreover, because the feed is exposed, varmints and other critters can climb onto the feeder and eat from the spinner plate unabated.

The spinner plate motor is activated by a battery-operated controller that is programmed to dispense food at pre-programmed times, typically during the daylight hours. Daylight hours are preferable for an observer, as during daylight the observer will be in the area of the feeder and therefore can see the animal when it comes to feed. However, game will change their activities to times of darkness because humans are present in the area. As a result, food that dispenses during daylight hours, sits on the ground until nightfall and is then consumed by the same animals that the observer was looking for during daylight. The feed is expensive and does not yield a positive outcome for the observer.

Lastly, operation of the spinner-type feeder is very loud and can be heard for hundreds of yards. The noise may attract game as they associate the noise with food. The noise will also signal other observers that there is a feeder in the area and the observers will congregate there, which in turn pressures the animals due to the presence of humans near the feeder. As a result, the animals will come to feed only during darkness when no humans are present.

The other common feeder is the gravity feeder. This feeder comprises a hopper filled with feed and a trough below the hopper. Gravity forces the feed from the hopper into the trough and thus the trough is always full of feed. This feeder allows both desirable and undesirable animals to eat as much feed as they want at any time of the day. As a result, the hopper empties in a very short period, thereby requiring frequent trips to the feeder to replenish it. Also, the feed is exposed to the weather; when rain soaks it the feed will clump and mold can develop within it.

SUMMARY OF INVENTION

The invention comprises an animal feeder constructed such that it:
1. Eliminates feed clumping
2. Prevents varmints and birds from eating the feed
3. Operates quietly
4. Dispenses the feed when activated by an animal
5. Programmable to establish an activation duration and a delay between successive activations of the feeder and delivery of the feed
6. Comprises an adjustable activation plate or bar to accommodate or exclude various animal sizes, in particular, animals of various heights.
7. Comprises flexible dispenser vanes to accommodate various types and sizes of feed

BRIEF DESCRIPTION OF THE DRAWINGS

The present invention can be more easily understood and the advantages and uses thereof more readily apparent when the following detailed description of the present invention is read in conjunction with the figures wherein.

In accordance with common practice, the various described features are not drawn to scale, but are drawn to emphasize specific features relevant to the invention. Like reference characters denote like elements throughout the figures and text.

DETAILED DESCRIPTION OF INVENTION

Figure 1:
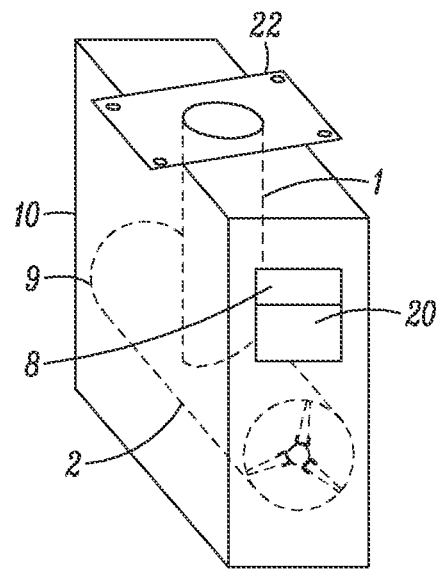
FIG. 1 is an isometric view of a feed dispenser of the present invention.
Figure 2:
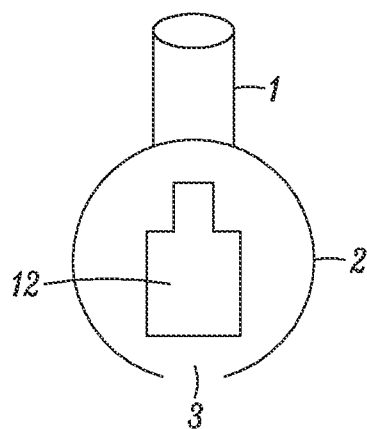
FIG. 2 is a rear view of the feed dispenser of the present invention.

The invention comprises an electronically-controlled motorized feeder (also referred to as a dispenser or feed dispenser) that is suitable for mounting below a hopper, pail, or another suitable feed container, with an opening defined in a bottom surface of the feeder through which the feed is dispersed when activated by an animal.

Elements of the Feeder

The feeder 9 of the present invention mounts to the underside of the feed container so that an opening in a lower surface of the container aligns with a feeder inlet tube 1. Contents from the container 24 (see element 24 in FIG. 4) fall into the feeder inlet tube 1 by gravity. FIGS. 1-5 illustrate the various elements described below.

The feeder 9 comprises an inlet tube 1, vertically oriented and intersecting a substantially horizontal dispensing cylinder 2 (also referred to as a dispensing tube). An opening or slot 3, through which the feed is dispersed, is defined in a lower surface of the dispensing cylinder 2.

A feed drive assembly comprises a plurality of flexible vanes 4 mounted on a shaft 5, which extend throughout a length of the dispensing cylinder 2. In one embodiment the vanes are constructed from a non-right or flexible material, such as vinyl, a flexible plastic material, or a brush-like material. With flexible vanes the feed is less likely to become lodged between the vanes and an inner surface of the dispensing cylinder 2 and thereby jam the drive mechanism and stop feed dispensing operations. The shaft is rotated by operation of a motor/gearbox 12 affixed to an end of the dispensing cylinder.

Figure 4:
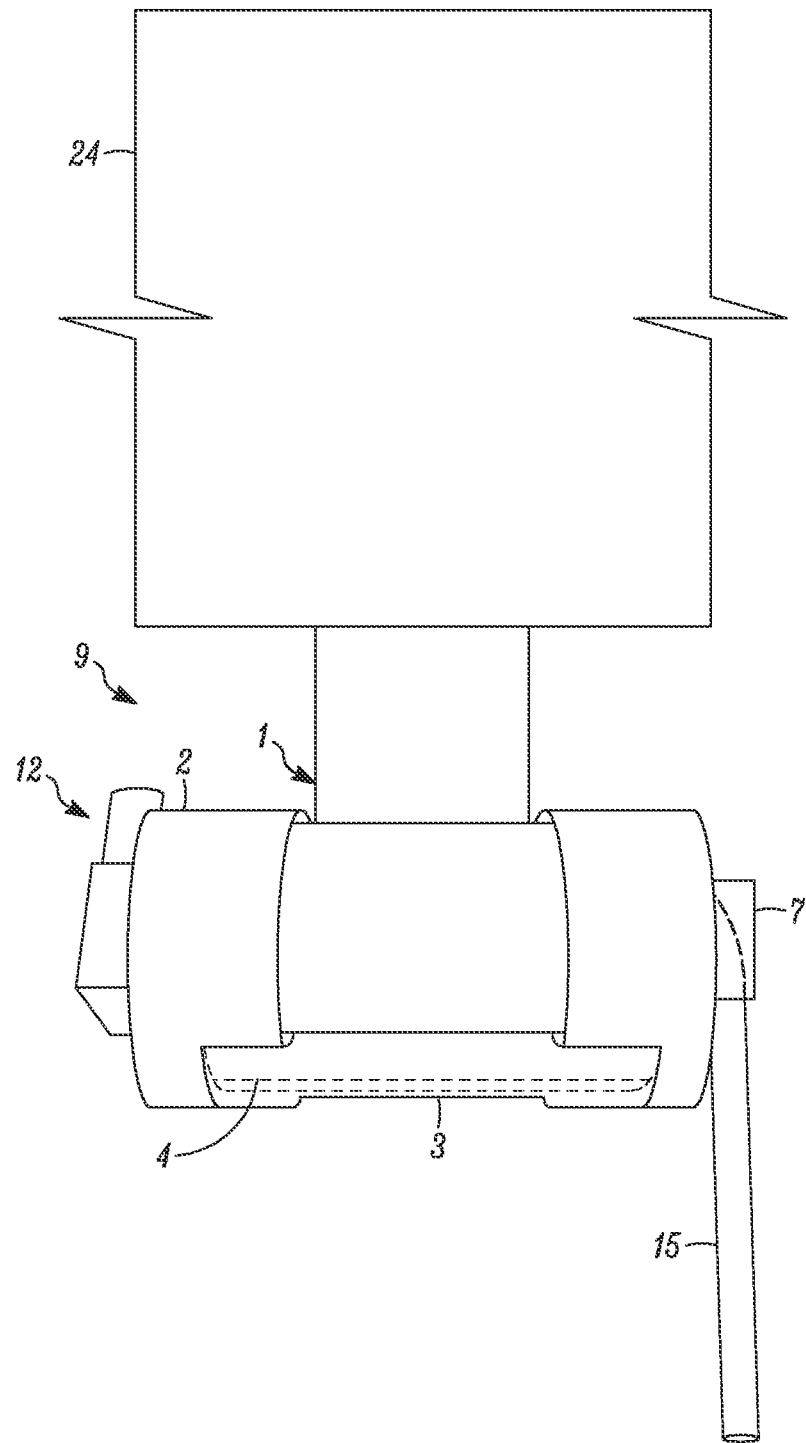
FIG. 4 is a side view of the feed dispenser of the present invention.
Figure 5:
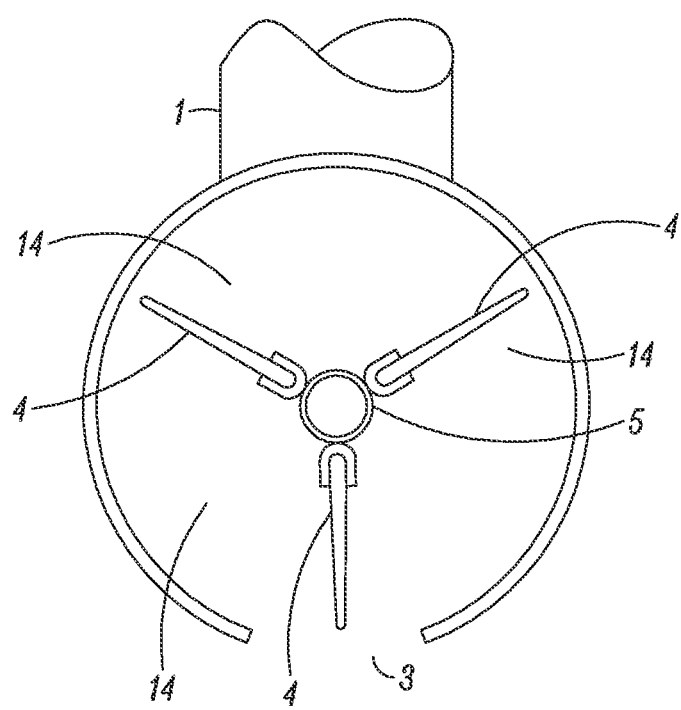
FIG. 5 is a front view of the feed drive assembly of the feed dispenser.

FIG. 5 illustrates an end view of the dispensing cylinder 2. Feed is directed into the feeder inlet tube 1 from a hopper or container (not shown in FIG. 5, but see element 24 in FIG. 4) mounted above the feeder inlet tube and then into one of three regions 14 between two adjacent vanes 4. As the vanes rotate, one of the regions 14, filled with feed, moves into alignment with the opening 3 defined along a bottom surface of the dispensing cylinder 2. The feed then passes through the opening 3 and drops to the ground below the dispenser 9. The dispenser can dispense various sizes of feed product, as fine as salt or sugar (granular products) up to feed products of about ⅞ inches in diameter. Dry feed product is preferably dispensed from the dispenser.

The vanes are dimensioned and spaced-apart such that feed will not fall through the opening 3 unless and until a portion of one of the regions 14 is aligned with the opening 3.

Spaced-apart electro-mechanical trigger switches 7 are disposed on an end of the dispensing cylinder 2. See FIG. 3. Activation (closing) of one of the two switches energizes the motor and gearbox 12 (see FIG. 4) causing the shaft 5 and the vanes 4 attached thereto to rotate.

Figure 3:
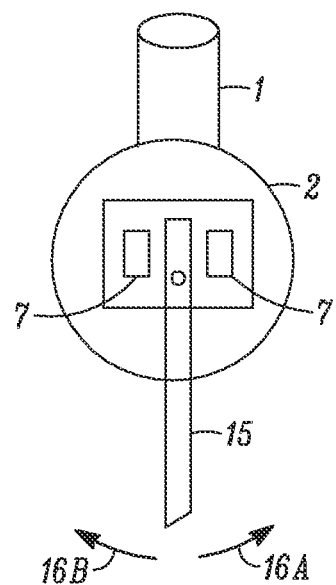
FIG. 3 is a front view of the feed dispenser of the present invention.

As shown in FIG. 3, a switch 7 is disposed on each side of an arm 15. When a force is applied in either direction 16A or 16B to the arm, one of the switches 7 is closed. With reference to FIG. 4, the arm 15 moves into and out from a plane of the figure. For an application in which the feeder is placed in an area where animals feed (such as deer), the arm 15 is moved as the animals wander around the feeder and bump the arm.

In one embodiment, closing one of the trigger switches 7 signals a controller 20 (see FIG. 1) that in turn activates the motor and gearbox 12. In another embodiment, as described above, the motor is activated directly when a switch is closed.

The controller 20 controls timed-based operations of the feeder 9. For example, the controller can be programmed such that when activated, the motor is energized for a programmable time duration. The controller can also be programmed to energize the motor, and thereby dispense the food, at one or more specific times during the day or night, without closing of one of the switches 7. Such frequent and periodic feed dispensing may cause certain animals to frequently return to the feeder to feed.

With reference to FIG. 1, certain components of the dispenser 9, as illustrated in FIGS. 2-5, are contained within an enclosure 10, comprising a rain-tight, durable, and varmint resistant cover for the dispenser.

The arm 15 and associated switches 7 are disposed on the dispenser 9 and enclosed within the enclosure 10. They are not illustrated in FIG. 1, but are located on the foreground side of the dispenser 9 as enclosed within the enclosure 10. The motor/gear box 12 are disposed on an opposing surface of the dispenser 9, as enclosed within the enclosure 10.

A length of the arm 15 is adjustable (by adding or removing arm segments) depending on the distance that the dispenser is set above the ground and the size and height of animals that are intended to activate the dispenser by applying a force to the arm.

A plate 22, see FIG. 1, is affixed to the enclosure 10 for attaching to the feed container or hopper (not shown in FIG. 1, but see element 24 of FIG. 4), such that an output end of the container or hopper is in flow communication with the inlet tube 1.

Electricity for operating the controller 20 and the motor and gearbox 12 is supplied from a battery 8, mounted within the enclosure 10 in a general region indicated by the reference numeral 8 in FIG. 1. Since the dispenser is typically located outdoors, a solar photovoltaic panel can also be used to supply power to the motor and controller.

The amount of feed dispensed is determined by the volume of the region 14 between successive vanes 4. However, if the volume of the regions 14 is made too large, the feed may sometimes leak from the opening 3, i.e., without activation of the motor to turn the shaft. The amount of feed dispensed is also determined by the duration of motor activation. Obviously, a longer activation duration dispenses more feed. The activation duration is determined by programming of the controller 20.

Sequence of Operation

The feed falls from the feed container into the inlet tube 1 and then into one of the regions 14 positioned at an outlet of the inlet tube. The feed cannot then flow from the opening or slot 3 in the dispensing cylinder 2 due to the spacing and location of the vanes 4 relative to the opening 3.

When an animal, sniffing around the ground below the feeder, bumps or strikes the arm 15, one of the electromechanical trigger switches 7 closes and a signal is sent to the controller 20, activating the motor 12. The motor rotates the shaft 5 and thus the dispenser vanes 4 to transfer the feed from one of the regions 14 through the slot 3. The feed falls through the slot to the ground for the animal to eat.

Delayed Activation of Operation

When the animal activates one of the electro-mechanical switches 7, while moving below the feeder and striking the arm 15, the feed is dispensed from the feeder 9. Generally, the animal will stay near the feeder and continue to eat until all the feed is consumed. To avoid this situation, the controller can be user-programmed not to dispense food every time the switch is closed. Instead, the controller can be programed to delay the time interval between successive activations of the motor and gearbox 12, i.e., activating the motor and gear box only after a predetermined time interval after the most recent activation. Or the controller can be programmed to activate the motor and gearbox 12 only after a predetermined number of switch closures or dispenser activations. For example, the controller can be programmed to activate the motor only after every fifth closure of one of the switches 7. The time delays and all activation timing features are user programmable.

In addition to the time delay between activations, the feeder can be deactivated for a user-selected duration. Or, if the user does not wish to dispense food during dark hours, or any other time, for example, a "no dispense time interval" can be programmed into the controller. During this interval the feeder will not dispense feed even if one of the switches 7 is closed. The activation sequence resumes upon termination of the "no-dispense interval."

In addition, the user can program a time-of-day event, controlling the feeder to dispense feed (i.e., activate the motor and gear box) only at a specific time each day, absent an animal striking the arm 15.

It is expected that animals will visit the feeder routinely throughout the day and night in expectation that food will be available there, accidentally bumping the arm 15 to actually dispense the feed.

Result

This novel and nonobvious animal feeder resolves problems associated with feed exposure to the weather and to varmints or other undesirable occurrences, and unnecessary feeder noise, controls feed dispensing only when an animal is present at the feeder, and controls the amount of feed dispensed. The feeder of the present invention is suitable for use with wild game, farm animals, domestic animals, and pets.

What is claimed is:

1. A dispenser for dispensing animal feed, comprising:
    a vertically-oriented inlet tube for receiving the animal feed from a container holding the feed;
    a fixed horizontally-oriented dispensing tube intersecting the vertical inlet tube, the dispensing tube defining a longitudinal slot located in a lower surface thereof through which the feed is dispensed;
    a longitudinal feed drive assembly rotatable within the dispensing tube and comprising a plurality of vanes each one mounted on an axial shaft, the vanes extending axially along the shaft and extending radially from the shaft, wherein two consecutive axial vanes define a region therebetween, the regions for receiving and retaining therein, the feed from the inlet tube;
    a motor coupled to the feed drive assembly for rotating the axial shaft and the axial vanes attached thereto when power is applied to the motor;
    first and second spaced-apart switches closure of either the first or the second switch causing power to be supplied to the motor;
    an arm extending downwardly from and pivotally attached to the dispenser between the first and second switches, a force applied to the arm causing the arm to rotate about a pivot point, thereby closing either the first or second switch and causing power to be supplied to the motor; and
    wherein rotation of the motor and thereby rotation of the axial shaft and the axial vanes attached thereto moves one of the plurality of regions holding feed into alignment with the longitudinal slot to thereby dispense feed through the longitudinal slot onto a surface below the dispenser.

2. The dispenser of claim 1, wherein as the plurality of vanes rotate, a longitudinal edge of each vane traces out a cylindrical shape.

3. The dispenser of claim 1, wherein the vanes extending along the axial shaft comprises the vanes extending substantially a length of the dispensing tube.

4. The dispenser of claim 3, wherein the plurality of vanes comprises three vanes with a region between two consecutive vanes dimensioned and spaced apart to dispense the feed through the longitudinal slot when the feed drive assembly has been rotated, by action of the motor, to rotate a region holding feed into alignment with the longitudinal slot.

5. The dispenser of claim 1, wherein a material of each one of the plurality of vanes comprises a non-rigid or flexible material.

6. An enclosure for enclosing and supporting the dispenser of claim 1, the enclosure attached to the container such that feed within the container flows into the inlet tube of the dispenser.

7. The dispenser of claim 1, wherein a length of the arm is adjustable.

8. The dispenser of claim 1, further comprising a battery or a photovoltaic panel for providing power to the motor.

9. The dispenser of claim 8, wherein closing of either the first or the second switch activates a controller for causing power to be supplied to the motor from the battery or from the photovoltaic panel.

10. The dispenser of claim 9, wherein the controller is user-programmable to control dispensing of the feed.

11. The dispenser of claim 9, wherein the controller is programmable such that power is not supplied to the motor each time the first or the second switch is closed.

12. The dispenser of claim 9, wherein the controller is programmable such that power is supplied to the motor for a predetermined duration each time one of the first and second switches is closed.

13. The dispenser of claim 9, wherein the controller is programmable such that power is supplied to the motor only during predetermined time windows of a day responsive to closure of one of the first and second switches.

14. The dispenser of claim 9, wherein the controller is programmable to set a "no-dispense interval" during which feed is not dispensed despite closure of one of the first or second switches.

15. The dispenser of claim 1, wherein the feed comprises dry feed ranging in size from a granular feed product to a feed product about ⅞ inches in diameter.

16. The dispenser of claim 1, wherein the first and second spaced-apart switches are mounted on or proximate the dispenser.

17. A dispenser for dispensing animal feed, comprising:
    an inlet tube oriented in a substantially vertical orientation and disposed in an upper region of the dispenser for receiving the animal feed from a container disposed above the dispenser;
    a fixed dispensing tube oriented in a substantially horizontal orientation and intersecting the closed inlet tube, the dispensing tube defining a longitudinal slot located in a lower surface thereof through which the feed is dispensed;
    a longitudinal feed drive assembly, rotatable within the dispensing tube and comprising an axial shaft and a plurality of spaced-apart vanes affixed to and longitudinally extending along the shaft and radially extending from the shaft, a region between two consecutive vanes for receiving and holding feed and dispensing same through the longitudinal slot when the feed drive assembly is rotated, by action of a motor, to align a region holding feed with the longitudinal slot;
    a power source for rotating the motor;
    first and second spaced-apart switches closure of either the first or the second switch causing power to be supplied from the power source to the motor or to a controller that controls operation of the motor;
    an adjustable-length arm extending downwardly from and pivotally attached to the dispenser between the first and second switches, a force applied to the arm causing the arm to rotate about a pivot point thereby closing either the first or second switch and causing power to be supplied from the power source to the motor or to the controller;
    wherein rotation of the motor and thereby rotation of the feed drive assembly moves a region holding feed into alignment with the longitudinal slot to dispense feed through the opening onto a surface below the dispenser; and
    the controller user-programmable to control dispensing of the feed by controlling the supply of power to the motor.

* * * * *